J. R. W. MENGER.
COVER HOLDER FOR COOKING UTENSILS.
APPLICATION FILED MAR. 13, 1912.
1,068,151.
Patented July 22, 1913.
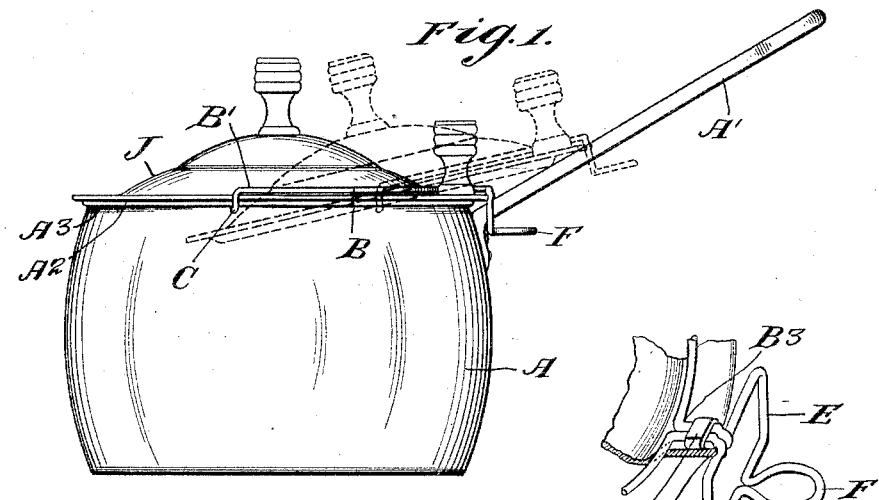
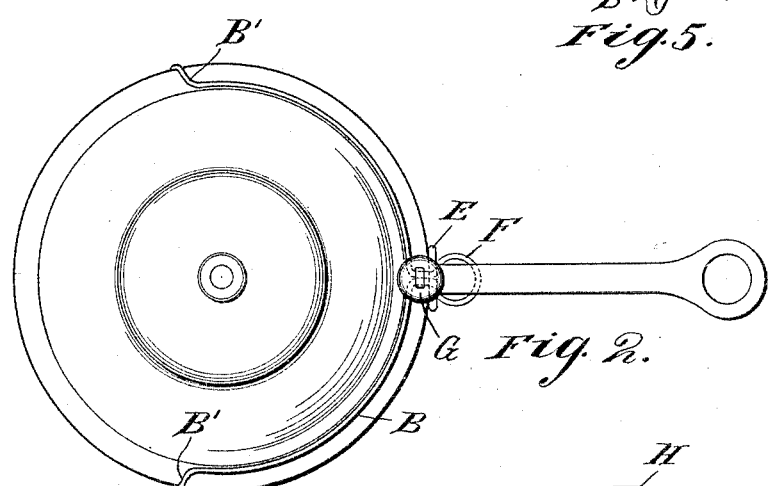
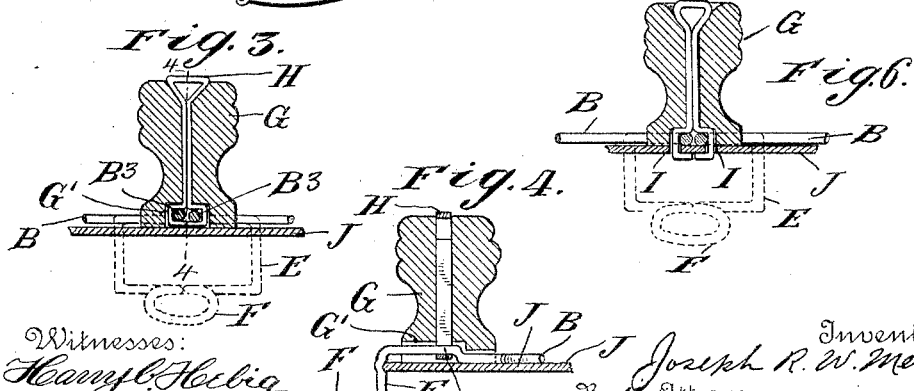
Witnesses:
Harry C. Hebig
Minnie S. Nuller
Inventor
Joseph R. W. Menger
By his Attorney
Frank H. Ashley
COLUMBIA PLANOGRAPH CO., WASHINGTON, D. C.

UNITED STATES PATENT OFFICE.

JOSEPH R. W. MENGER, OF NEW YORK, N. Y.

COVER-HOLDER FOR COOKING UTENSILS.

1,068,151.  Specification of Letters Patent.  Patented July 22, 1913.

Application filed March 13, 1912. Serial No. 683,442.

*To all whom it may concern:*

Be it known that I, JOSEPH R. W. MENGER, a citizen of the United States, and a resident of New York city, in the county of New York and State of New York, have invented certain new and useful Improvements in Cover-Holders for Cooking Utensils, of which the following is a specification.

My invention relates to cooking utensils and particularly to pots having covers.

The object of my invention is to provide means for holding a cover firmly in position on the pot and also constructed to grip the cover so that same may be withdrawn from over the pot a limited distance while still holding the cover to the top thereof.

A further object is to provide a simple and cheap construction that can be quickly connected to the cover and easily removed therefrom so that it can be made and sold as a separate article of manufacture.

A further object is to provide a construction that will fit covers of different diameters within reasonable limits.

My device will be hereinafter referred to as a cover-holder.

Referring to the drawings which form a part of this specification Figure 1 is a side elevational view of a pot with my cover-holder mounted thereon. Fig. 2 is a plan view thereof. Fig. 3 is a vertical sectional view through the knob portion of the holder. Fig. 4 is a section through line 4—4 of Fig. 3. Fig. 5 is a perspective view of the guide portion of the cover as it appears when the knob is omitted. Fig. 6 is a view showing the construction preferred when the holder is permanently attached to the cover.

A, indicates a cooking pot having a handle A' extending at an angle therefrom, and the top edge of which is provided with a laterally extending bead $A^2$, thereby forming an annular groove $A^3$ in such pots as are formed with an enlarged diameter just below the bead.

B, indicates a single piece of wire, the ends C—C of which are bent so as to project inwardly toward the pot body and rest below the bead $A^2$ in front of the median line of the cover, and the portions B'—B' respectively rest on the top surface of the cover near its edge, thus serving to clamp the cover to the beaded edge. The wire is also bent to approximately conform to the curve of the outer periphery of the cover and rests in contact therewith. The arm portions $B^3$—$B^3$ respectively are bent and are clamped together by a band of wire or sheet metal D, and the wire is further bent to engage the edge of the cover as shown at $B^4$, and then to form a loop E, preferably rectangular in shape, and then to form a horizontally extending loop or projection F. Where the knob G is employed, I prefer to recess the under side as indicated at G', and pass a wire H down through the center of the knob and bend its ends around the portions $B^3$. It will be understood that the wire B is made of good spring wire to yieldably clamp the cover to the pot.

In Fig. 6, I have shown the cover-holder clamped to the cover, the ends of the wire H being passed through holes I—I in the cover J and bent toward each other, thus holding the wire B to the cover and also holding the knob to the wire. The dotted lines in Fig. 1 illustrate the position of the cover when partly withdrawn from over the pot.

A person can handle a small pot with one hand, by grasping the handle A' and placing the forefinger under the loop F and forcing it upward and then drawing it upward in line with the handle, the ends C—C of the wire engage the outer edge of the cover and draw it backward from the top of the pot, the groove portion $B^4$ serving to hold the rear edge of the cover firmly. The loop E serves to guide the cover properly on the handle and prevents the cover from moving laterally over the pot.

In some pots where the cover does not extend beyond the bead $A^2$ of the pot, the cover does not engage the groove $B^4$ until it has been moved slightly from over the pot, but snaps into position as soon as the cover is tilted slightly, as will be readily understood.

Where large pots are to be used with my cover-holder, I prefer the knob construction, since both hands are usually employed in handling the pot and one hand can then grasp the handle while the other grasps the knob, and the cover can be more easily manipulated.

Having thus described my invention, I claim as new :—

1. A cover-holder having resilient arms adapted to overlie the top edge portion of a pot cover and the ends of which extend under the bead of a pot, and having a portion at one side provided with a loop extending in a plane transverse to said arms, said loop being adapted to slidingly engage a pot handle of the character described.

2. A cover-holder having resilient arms adapted to overlie the top outer portions of a pot cover and the ends of which are adapted to extend under the bead formed on the top edge of a pot, and including a guiding portion at one side extending transversely of said arms embracing the pot handle to guide the cover-holder, and a handle extending from said guiding portion underneath the pot handle.

3. A cover-holder having resilient arms adapted to overlie the top outer portions of a pot cover and the ends of which extend under the bead formed on the top edge of a pot, and a guide portion at one side embracing the pot handle to serve as a guide for the cover-holder, and a knob connected to one side of said holder.

4. A cover-holder having resilient arms, the ends of which are hook-shaped, said arms being curved and united together, and having a groove or notch formed adjacent the junction and adapted to engage the edge portion of a pot cover and a guide extending transversely of the arms and embracing the handle.

5. A cover-holder having resilient arms, the ends of which are hook-shaped, said arms being curved and united together, and having a groove or notch formed adjacent the junction and adapted to engage the edge portion of a pot cover, and a guide loop extending transversely of the arms adapted to engage a pot handle of the character described.

Signed at New York city, in the county of New York and State of New York this 4th day of March A. D. 1912.

JOSEPH R. W. MENGER.

Witnesses:
FRANK M. ASHLEY,
MINNIE S. MILLER.

Copies of this patent may be obtained for five cents each, by addressing the "Commissioner of Patents, Washington, D. C."